US011050860B2

(12) United States Patent
Cheng

(10) Patent No.: US 11,050,860 B2
(45) Date of Patent: Jun. 29, 2021

(54) METHOD AND APPARATUS FOR NETWORK ADDRESS ANALYSIS

(71) Applicant: QNAP SYSTEMS, INC., New Taipei (TW)

(72) Inventor: Nai-Yuan Cheng, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 16/112,809

(22) Filed: Aug. 27, 2018

(65) Prior Publication Data

US 2019/0349455 A1 Nov. 14, 2019

(30) Foreign Application Priority Data

May 8, 2018 (TW) ................... 107115536

(51) Int. Cl.
*H04L 29/06* (2006.01)
*H04L 29/12* (2006.01)

(52) U.S. Cl.
CPC .......... *H04L 69/22* (2013.01); *H04L 61/2015* (2013.01)

(58) Field of Classification Search
CPC ...... H04L 92/22; H04L 61/2015; H04L 69/22
See application file for complete search history.

(56) References Cited

U.S. PATENT DOCUMENTS

| 7,930,734 B2 * | 4/2011 | Foo ..................... H04L 63/1433 726/5 |
| 9,860,225 B1 | 1/2018 | Chamberlin et al. |
| 2001/0054101 A1 * | 12/2001 | Wilson .............. H04L 29/12018 709/225 |
| 2002/0161870 A1 * | 10/2002 | French ................. G06F 9/4416 709/222 |
| 2010/0122338 A1 * | 5/2010 | Kataoka .............. H04L 61/2015 726/12 |
| 2010/0191813 A1 * | 7/2010 | Gandhewar ......... H04L 61/2015 709/206 |
| 2014/0222987 A1 | 8/2014 | Pearson et al. |
| 2017/0207965 A1 * | 7/2017 | Kishida ............... H04L 61/2053 |

FOREIGN PATENT DOCUMENTS

| CN | 101662511 | 3/2010 |
| TW | 201315273 | 4/2013 |
| WO | WO-2008141584 A1 * | 11/2008 ......... H04L 63/1416 |

OTHER PUBLICATIONS

"Office Action of Taiwan Counterpart Application," dated Oct. 31, 2018, p. 1-p. 7.

* cited by examiner

*Primary Examiner* — Nicholas R Taylor
*Assistant Examiner* — Christopher B Robinson
(74) *Attorney, Agent, or Firm* — JCIPRNET

(57) ABSTRACT

A method and an apparatus for network address analysis are provided. In the method, unique identification information of a target client device located in a local area network is obtained. Packets transmitted in the local area network are listened, and a packet transmitted between the target client device and a dynamic host configuration protocol (DHCP) server is identified from the listened packets according to the unique identification information. Finally, the identified packet is analyzed to obtain a network address assigned to the target client device by the DHCP server.

10 Claims, 4 Drawing Sheets

METHOD AND APPARATUS FOR NETWORK ADDRESS ANALYSIS

CROSS-REFERENCE TO RELATED APPLICATION

This application claims the priority benefit of Taiwan application serial no. 107115536, filed on May 8, 2018. The entirety of the above-mentioned patent application is hereby incorporated by reference herein and made a part of this specification.

BACKGROUND

Field of the Invention

The invention relates to a method and an apparatus for network connection and more particularly, to a method and an apparatus for network address analysis.

Description of Related Art

A network-attached storage (NAS) device is an apparatus dedicated to store data and is capable of being independently connected to a network, so as to provide centralized data storage, backup and sharing functions for devices on heterogeneous networks. To deal with a large number of data access demands, many enterprises configure multiple NAS devices on Intranets for storing and protecting important data thereof. In response to the increase of the NAS devices, an enterprise network management personnel may collectively manage the operation of all the NAS devices by using a management device.

When a new NAS device is to be configured, the network management personnel may first establish a network connection for the management device and the NAS device, so as to set functions of the NAS device. However, if the enterprise Intranet adopts a dynamic host configuration protocol (DHCP), as an internetwork protocol (IP) of each client device is dynamically assigned, the management device cannot obtain the IP address of the newly configured NAS device and as a result, fails to be connected with the new NAS device.

For this regard, in a current technique, an agent is installed on each client device, such that the management device may request the agent of each client device on the network to reply an IP address by means of transmitting broadcast packets and finally obtain a network address of a target client device. FIG. 1 is a schematic view of a conventional method for network address analysis. In the conventional method, agents 12a, 14a and 16a are installed on a target client device 12 and client devices 14 and 16, such that a management device 10 may, by means of transmitting broadcast packets, request IP addresses from all the client devices 12, 14 and 16 and identify the IP address of the target client device 12 from a message replied by the agent 12a. However, this method may not only require pre-installation of the agents, but also result in a situation of broadcast congestion.

SUMMARY

The invention provides a method and an apparatus for network address analysis, capable of quickly and automatically obtaining a network address of a target client device by listening packets transmitted in a local area network.

A method for network address analysis of the invention is adapted to a management device located in a local area network. In the method, unique identification information of a target client device located in the local area network is obtained, packets transmitted in the local area network are listened, a packet transmitted between the target client device and a dynamic host configuration protocol (DHCP) server is identified from the listened packets according to the unique identification information, and finally, the identified packet is analyzed to obtain a network address assigned to the target client device by the DHCP server.

In an embodiment of the invention, the step of identifying the packet transmitted between the target client device and the DHCP server from the listened packets according to the unique identification information includes determining whether identification information of a sending terminal or a receiving terminal recorded in each of the packets matches the unique identification information of the target client device, if yes, determining whether the identification information recorded in each of the packets matches identification information of the DHCP server, and if yes, determining that the packet is one transmitted between the target client device and the DHCP server.

In an embodiment of the invention, the step of identifying the packet transmitted between the target client device and the DHCP server from the listened packets according to the unique identification information further includes if the identification information recorded in the packet does not match the unique identification information of the target client device or does not match the identification information of the DHCP server, re-listening a next packet transmitted in the local area network and performing the identification and the analysis.

In an embodiment of the invention, the step of analyzing the identified packet to obtain the network address assigned to the target client device by the DHCP server includes unpacking the identified packet, determining whether the unpacked packet is a DHCP request packet, and if the unpacked packet is the DHCP request packet, reading the DHCP request packet to obtain the network address.

In an embodiment of the invention, the step of analyzing the identified packet to obtain the network address assigned to the target client device by the DHCP server further includes if the unpacked packet is not the DHCP request packet, re-listening a next packet transmitted in the local area network and performing the identification and the analysis.

In an embodiment of the invention, the step of listening the packets transmitted in the local area network is performed in a predetermined time period after the target client device is booted or rebooted or periodically.

In an embodiment of the invention, the unique identification information includes one or a combination of a media access control (MAC) address, a network card name, a device name and a device model.

An apparatus for network address analysis of the invention includes a communication device, a storage medium and a processor. The communication device is connected with a local area network. The processor is coupled to the communication device and the storage medium, obtains unique identification information of a target client device located in the local area network, listens packets transmitted in the local area network via the communication device, identifies a packet transmitted between the target client device and a DHCP server from the listened packets according to the unique identification information, analyzes the identified packet to obtain a network address assigned to the target client device by the DHCP server and records the network address in the storage medium.

In an embodiment of the invention, the processor determines whether identification information of a sending terminal or a receiving terminal recorded in each of the packets matches the unique identification information of the target client device, if yes, determines whether the identification information recorded in each of the packets matches identification information of the DHCP server, and if yes, determines that the packet is one transmitted between the target client device and the DHCP server.

In an embodiment of the invention, if the identification information recorded in the packet does not match the unique identification information of the target client device or does not match the identification information of the DHCP server, the processor re-listens a next packet transmitted in the local area network and performs the identification and the analysis.

In an embodiment of the invention, the processor unpacks the identified packet, determines whether the unpacked packet is a DHCP request packet, and if the unpacked packet is the DHCP request packet, reads the DHCP request packet to obtain the network address.

In an embodiment of the invention, if the unpacked packet is not the DHCP request packet, the processor re-listens a next packet transmitted in the local area network and performs the identification and the analysis.

In an embodiment of the invention, the processor listens the packets transmitted in the local area network in a predetermined time period after the target client device is booted or rebooted or periodically listens the packets.

In an embodiment of the invention, the unique identification information includes one or a combination of a MAC address, a network card name, a device name and a device model.

To sum up, in the method and the apparatus for network address analysis of the invention, the packets transmitted in the local area network are listened in a predetermined time period after the target client device is booted or rebooted, and a packet transmitted between the target client device and the DHCP server is identified, so as to obtain the network address of the target client device therefrom. In this way, a purpose of quickly obtaining the network address of the target client device and automatically establishing a connection can be achieved.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In a dynamic host configuration protocol (DHCP) architecture, whenever a new client device is added to a local area network, a DHCP server dynamically assigns an internetwork protocol (IP) address to the client device and encloses the assigned IP address in a packet transmitted to the client device. In the invention, based on the characteristic, packets transmitted in a local area network are listened in a time period after the client device is booted or rebooted to identify the packet transmitted to the client device by the DHCP server, and the IP address assigned to the client device is obtained through analyzing the packet, so as to automatically establish a network connection with the client device.

Figure 1:
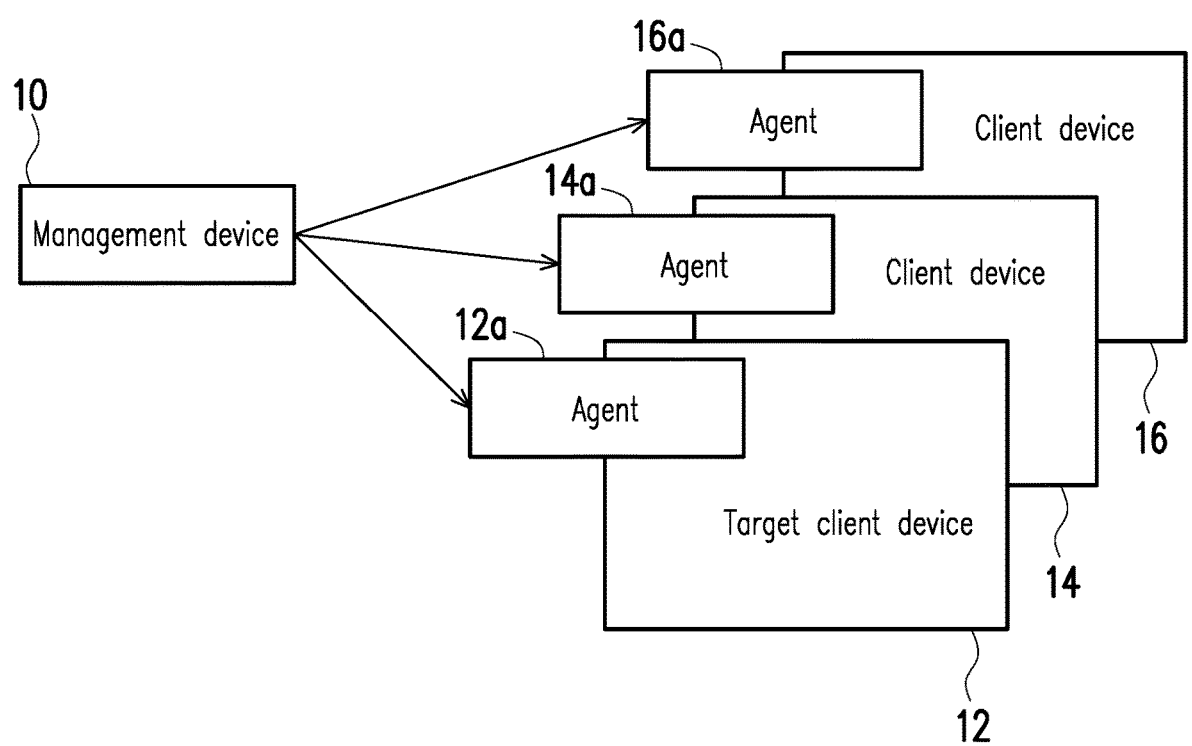
FIG. 1 is a schematic view of a conventional method for network address analysis.
Figure 2:
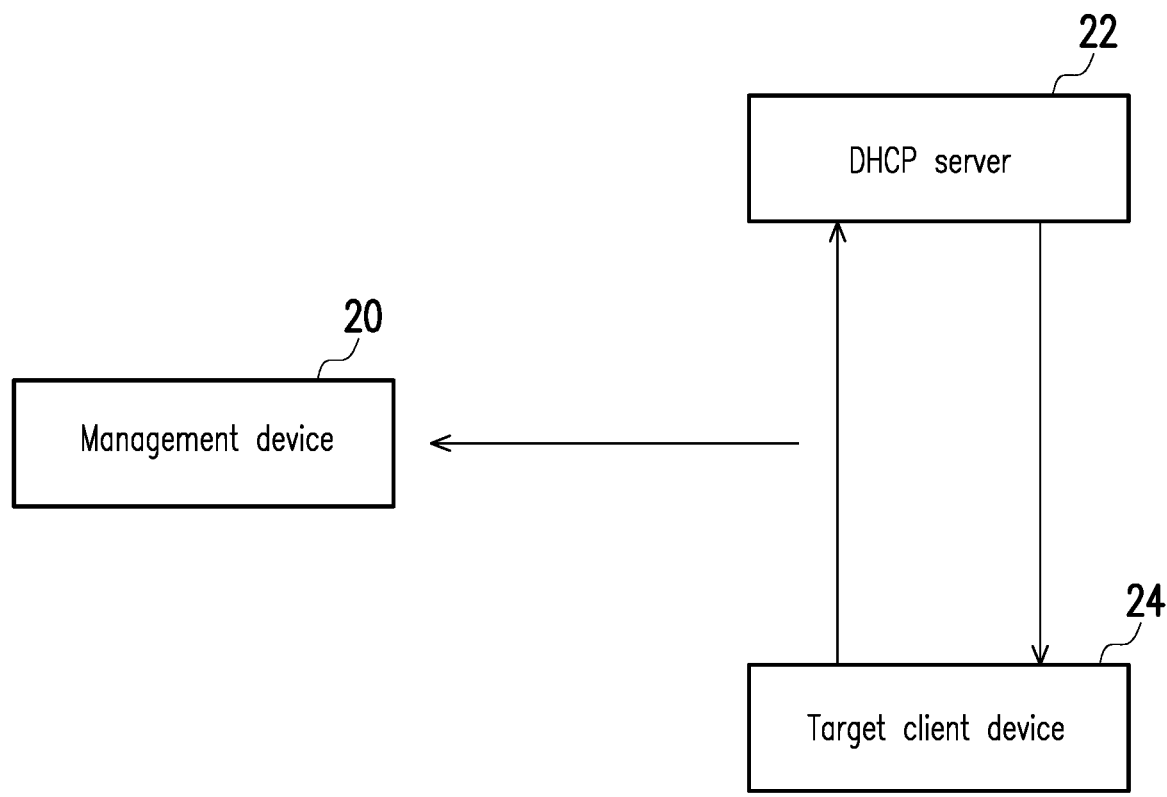
FIG. 2 is a scheme view of a method for network address analysis according to an embodiment of the invention.

For instance, FIG. 2 is a scheme view of a method for network address analysis according to an embodiment of the invention. Referring to FIG. 2, a DHCP server 22 of the embodiment of the invention provides a currently available IP address (e.g., 10.1.1.1) to a target client device 24, for example, when the target client device 24 is added to a network, and the target client device 24 receives an IP address provided by the DHCP server 22 through sending a request to the DHCP server 22. In this circumstance, a management device 20 of the embodiment of the invention listens all packets transmitted from the address or sent to the address, for example, according to a media access control (MAC) address (e.g., 00055DE80FA3) of the target client device 24, so as to obtain a network address assigned to the target client device 24 by the DHCP server 22. Thereby, the management device 20 is capable of quickly and automatically establishing a connection with the target client device 24.

Figure 3:
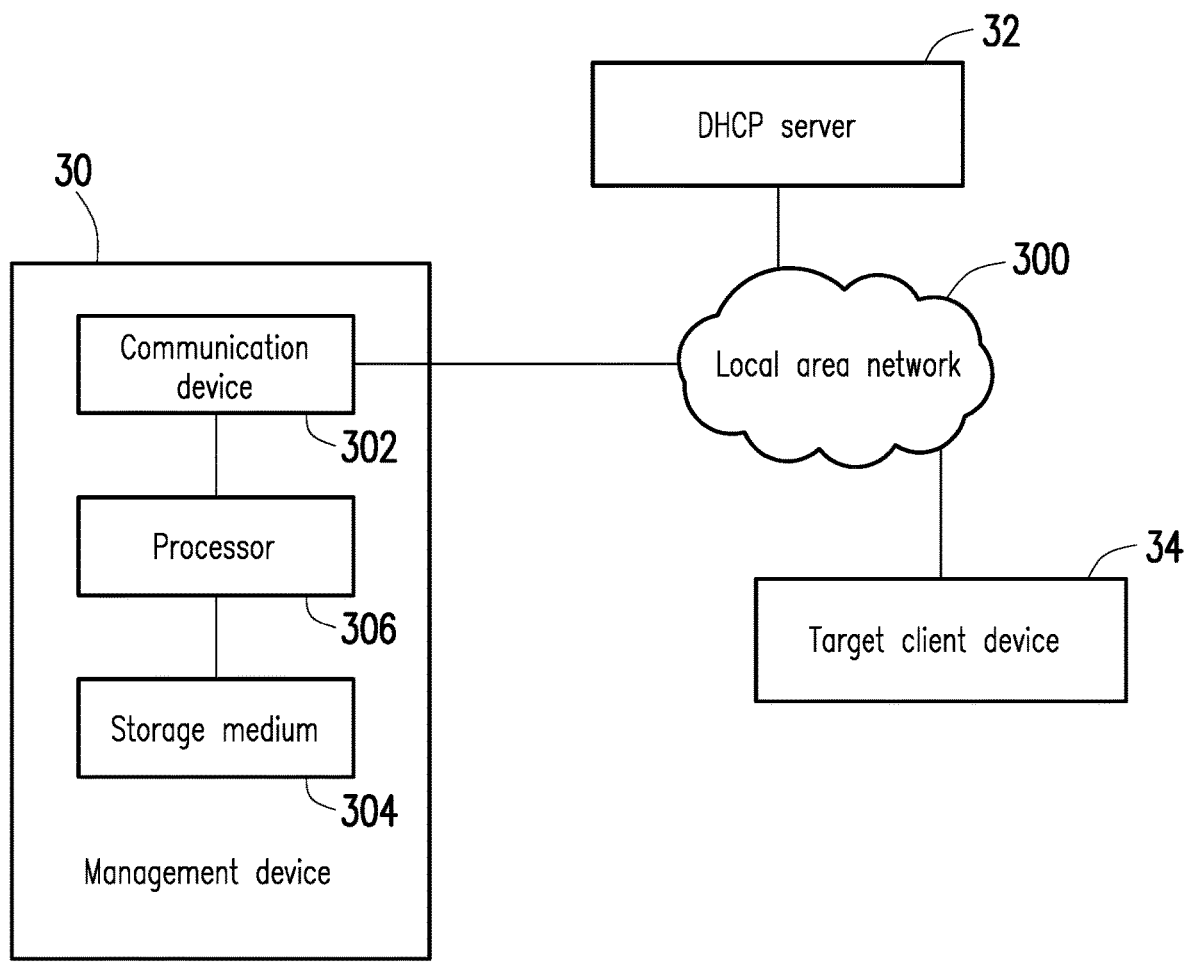
FIG. 3 is a scheme view of a network address analysis apparatus connected to a network according to an embodiment of the invention.

FIG. 3 is a scheme view of a network address analysis apparatus connected to a network according to an embodiment of the invention. Referring to FIG. 3, a network address analysis device of the present embodiment is, for example, a management device 30 illustrated in FIG. 3 which is connected with a local area network 300 together with an external DHCP server 32 and a target client device 34. The local area network 300 is, for example, Ethernet, Intranet or Internet, which are not limited in the invention.

The management device 30 is, for example, a computation device with computation capability, such as a file server, a database server, an application server, a workstation, a personal computer (PC) or a cell phone, and the target client device 34 is, for example, a network-attached storage (NAS) server or any other type of network storage apparatus which is capable of providing a centralized data access service for electronic devices (including the management device 30) on the local area network 300 and serially connecting electronic devices, such as a computer, a television and a cell phone through the local area network 300 for sharing files with one another.

The management device 30 includes a communication device 302, a storage medium 304 and a processor 306, and capabilities thereof will be described as follow.

The communication device 302 is, for example, a wireless network card supporting a wireless communication standard, e.g., an institute of electrical and electronics engineers (IEEE) 802.11n/b/g standard, or a network card supporting wired network connection, e.g., Ethernet, which may conduct a network connection with other electronic devices on a network in a wireless or a wired networking manner.

The storage medium 304 is, for example, any type of fixed or movable random access memory (RAM), read only memory (ROM), flash memory, a like element or a combination of the aforementioned elements.

The processor 306 may be a central processing unit (CPU) or any other programmable microprocessor for general or special use, a digital signal processor (DSP), a programmable controller, an application specific integrated circuit (ASIC), a programmable logic device (PLD) or other similar devices, or a combination of these devices.

The processor 306 is coupled to the communication device 302 and the storage medium 304, is connected with the local area network 300 via the communication device 302 and executes programs or commands stored in the storage medium 304 to perform a method for network address analysis of the embodiments of the invention. An embodiment is provided hereinafter to describe detailed steps of the method.

Figure 4:
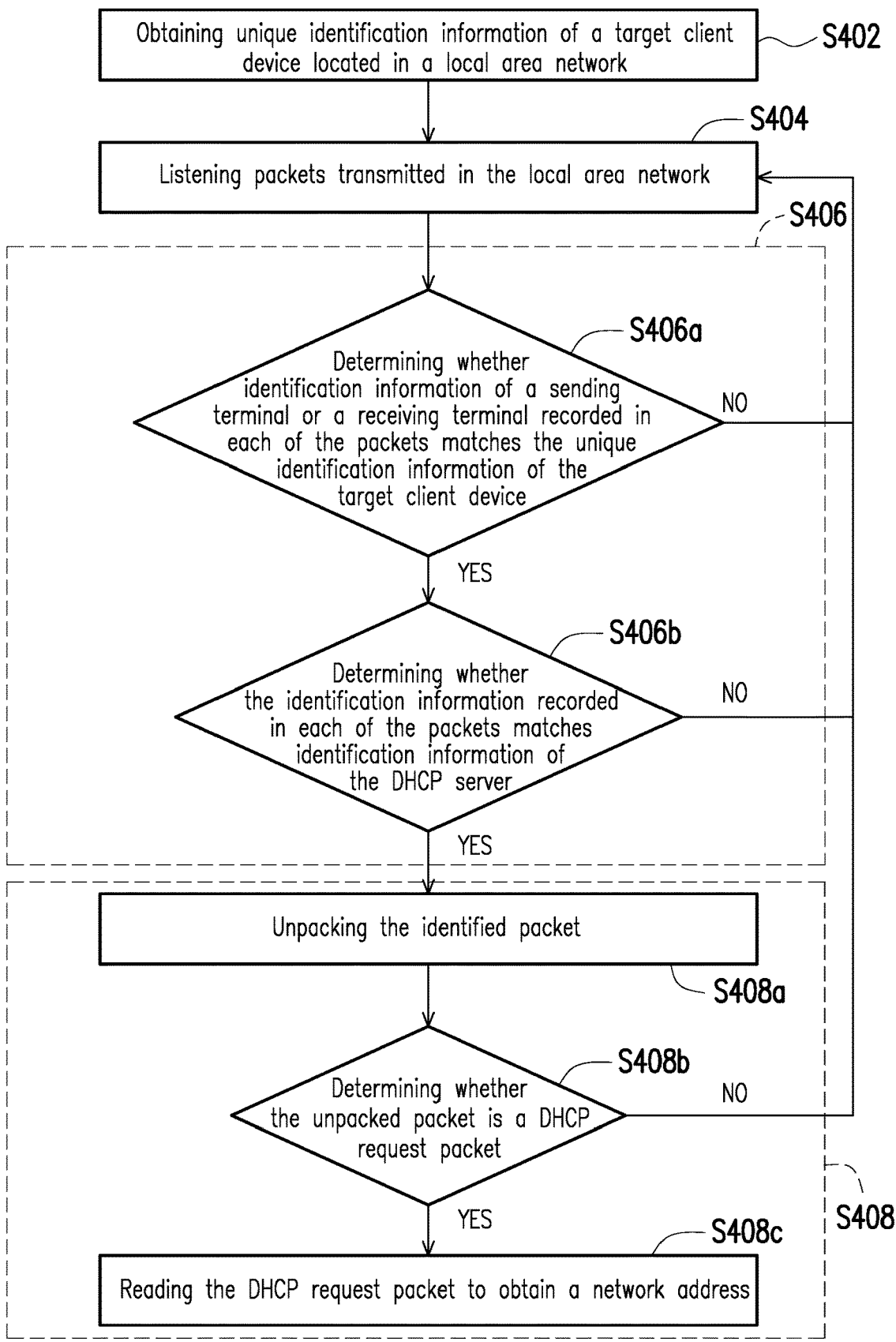
FIG. 4 is a flowchart of a method for network address analysis according to an embodiment of the invention.

FIG. 4 is a flowchart of a method for network address analysis according to an embodiment of the invention. Referring to FIG. 3 and FIG. 4 simultaneously, the method of the present embodiment is adapted to the aforementioned management device 30, and detailed steps of the method for network address analysis of the present embodiment will be described with reference to each device and element of the management device 30 as below.

First, the processor 306 obtains unique identification information of the target client device 34 located in the local area network 300 (step S402). The unique identification information may be obtained by a user's manual input, obtained from the target client device 34 via near-field wireless communication, such as the Bluetooth or radio frequency identification (RFID), or obtained by capturing the target client device 34 or a two-dimensional (2D) bar code on a package of the target client device 34 with the use of a camera, but the manner of obtaining the unique identification information is not limited in the present embodiment. The unique identification information includes one or a combination of a media access control (MAC) address, a network card name, a device name and a device model, which is not limited in the invention.

Then, the processor 306 listens packets transmitted in the local area network 300 via the communication device 302 (step S404) and identifies a packet transmitted between the target client device 34 and the DHCP server 32 from the listened packets according to the pre-obtained unique identification information (step S406).

Specifically, in step S406, the processor 306 determines whether identification information of a sending terminal or a receiving terminal recorded in each of the packets matches the unique identification information of the target client device 34 (step S406a) to identify the packet transmitted or received by the target client device 34. The identification information of the sending terminal or the receiving terminal recorded in each of the packets is, for example, one or a combination of a MAC address, a network card name, a device name and a device model of the sending terminal device or the receiving terminal device.

If it is determined in step S406a that the identification information matches the unique identification information, it represents that the packet is one transmitted or received by the target client device 34, and a next step continues, where the processor 306 determines whether the identification information recorded in each of the packets matches identification information of the DHCP server 32 (step S406b) to identify the packet transmitted between the target client device 34 and the DHCP server 32. If it is determined in step S406a that the identification information does not match the unique identification information, it represents that the packet is not the one transmitted or received by the target client device 34, and step S404 is returned to, where the processor 306 re-listens a next packet transmitted in the local area network 300 and performs the identification and the analysis.

If it is determined in step S406b that the identification information matches the identification information of the DHCP server 32, it represents that the packet is the one transmitted between the target client device 34 and the DHCP server 32, and a next step continues, where the processor 306 analyzes the identified packet, so as to obtain a network address assigned to the target client device 34 by the DHCP server 32 (step S408). If it is determined in step S406b that the identification information does not match the identification information of the DHCP server 32, it represents that the packet is not the one transmitted between the target client device 34 and the DHCP server 32, and step S404 is returned to, where the processor 306 re-listens a next packet transmitted in the local area network 300 and performs the identification and the analysis. In other embodiments, steps S406a and S406b may be exchanged, the sequence of steps S406a and S406b is not limited to that of the present embodiment.

In step S408, the processor 306 first unpacks the identified packet (step S408a) and then determines whether the unpacked packet is a DHCP request packet (step S408b). If it is determined as "Yes" in step S408b, it represents that the unpacked packet is the DHCP request packet, and a next step continues, where the processor 306 reads the DHCP request packet to obtain the network address (step S408c) and establishes a connection with the target client device 34. If it is determined as "No" in step S408b, it represents that the unpacked packet is not the DHCP request packet, and step S404 is returned to, where the processor 306 re-listens a next packet transmitted in the local area network 300 and performs the identification and the analysis.

Taking FIG. 2 for example, when the target client device 34 is just connected or added to the local area network, the DHCP server 32 provides the network address (e.g., 10.1.1.1) to the target client device 34, and the target client device 34 receives the network address. In this circumstance, the management device 30 may use the pre-obtained unique identification information (e.g., the MAC address 00055DE80FA3) of the target client device 34 to listen the packets transmitted in the local area network 300, so as to identify a packet recording a MAC address of the sending terminal or the receiving terminal which matches the MAC address (i.e., 00055DE80FA3) of the target client device 34. The management device 30 further determines whether the identification information recorded in the identified packet matches the identification information of the DHCP server 32, i.e., determines whether the sending terminal or the receiving terminal of the packet is from the DHCP server 32. If it is determined as "Yes", the management device 30 unpacks the identified packet and further determines whether this packet is the DHCP request packet. If it is determined as "Yes", the management device 30 reads the DHCP request packet to obtain the network address (10.1.1.1) assigned to the target client device 34 by the DHCP server 32 and establishes the connection with the target client device 34.

In addition, in an embodiment of the invention, the method for network address analysis is selected to be performed, for example, in a predetermined time period (e.g., 10 or 30 seconds) after the target client device 34 is booted or rebooted. In another embodiment of the invention, the method for network address analysis is performed, for example, periodically every predetermined time period (e.g., 3 or 6 hours), thereby dynamically detecting whether the IP address of the target client device 34 is changed and re-establishing the connection with the target client device 34.

Based on the above, in the method and the apparatus for network address analysis of the invention, after the identification information of the target client device is obtained, the packets transmitted in the local area network are listened, the packet transmitted between the target client device and the DHCP server is identified according to the identification information and finally, the network address of the target client device is obtained by analyzing the packet. Thereby, the broadcast congestion does not occur to the management device and the target client device during the connection process, and no agents have to be installed on the target client device, such that the network address of the target client device can be quickly and automatically obtained.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A method for network address analysis, adapted to a management device located in a local area network, the method comprising:
    obtaining unique identification information of a target client device located in the local area network;
    listening packets transmitted in the local area network;
    identifying a packet transmitted between the target client device and a dynamic host configuration protocol (DHCP) server from the packets which have been listened according to the unique identification information by:
        determining an identification information of a sending terminal or a receiving terminal recorded in each of the packets having matched the unique identification information of the target client device;
        determining the identification information of the sending terminal or the receiving terminal recorded in each of the packets having matched an identification information of the DHCP server in response to having determined that the identification information of the sending terminal or the receiving terminal recorded in each of the packets having matched the unique identification information of the target client device; and
        determining that one of the packets as an identified packet that is transmitted between the target client device and the DHCP server in response to having determined that the identification information of the sending terminal or the receiving terminal recorded in one of the each of the packets having matched the identification information of the DHCP server; and
    analyzing the identified packet to obtain a network address assigned to the target client device by the DHCP server by:
        unpacking the identified packet; and
        determining whether the unpacked packet being a DHCP request packet and
    reading the DHCP request packet to obtain the network address.

2. The method according to claim 1, wherein the step of identifying the packet transmitted between the target client device and the DHCP server from the packets which have been listened according to the unique identification information further comprises:
    if the identification information recorded in the packet does not match the unique identification information of the target client device or does not match the identification information of the DHCP server, re-listening a next packet transmitted in the local area network and performing the identification and the analysis.

3. The method according to claim 1, wherein the step of analyzing the identified packet to obtain the network address assigned to the target client device by the DHCP server further comprises:
    if the unpacked packet is not the DHCP request packet, re-listening a next packet transmitted in the local area network and performing the identification and the analysis.

4. The method according to claim 1, wherein the step of listening the packets transmitted in the local area network is performed in a predetermined time period after the target client device is booted or rebooted or periodically.

5. The method according to claim 1, wherein the unique identification information comprises one or a combination of a media access control (MAC) address, a network card name, a device name and a device model.

6. An apparatus for network address analysis, comprising:
    a communication device, connected to a local area network;
    a storage medium; and
    a processor, coupled to the communication device and the storage medium, obtaining unique identification information of a target client device located in the local area network, listening packets transmitted in the local area network via the communication device, identifying a packet transmitted between the target client device and a DHCP server from the packets which have been listened according to the unique identification information, analyzing the identified packet to obtain a network address assigned to the target client device by the DHCP server and recording the network address in the storage medium,
    wherein the processor identifies the packet transmitted between the target client device and the DHCP server from the packets which have been listened according to the unique identification information by:
        determining an identification information of a sending terminal or a receiving terminal recorded in each of the packets having matched the unique identification information of the target client device;
        determining the identification information of the sending terminal or the receiving terminal recorded in each of the packets having matched an identification information of the DHCP server in response to having determined that the identification information of the sending terminal or the receiving terminal recorded in each of the packets having matched the unique identification information of the target client device; and
        determining that one of the packets as an identified packet that is transmitted between the target client device and the DHCP server in response to having determined that the identification information of the sending terminal or the receiving terminal recorded in one of the each of the packets having matched the identification information of the DHCP server,
    wherein the processor analyzes the identified packets to obtain the network address assigned to the target client device by the DHCP server by:
        unpacking the identified packet, determining the unpacked packet being a DHCP request packet and reading the DHCP request packet to obtain the network address.

7. The apparatus for network address analysis according to claim 6, wherein if the identification information recorded in the packet does not match the unique identification information of the target client device or does not match the identification information of the DHCP server, the processor re-listens a next packet transmitted in the local area network and performs the identification and the analysis.

8. The apparatus for network address analysis according to claim 6, wherein if the unpacked packet is not the DHCP request packet, the processor re-listens a next packet transmitted in the local area network and performs the identification and the analysis.

9. The apparatus for network address analysis according to claim 6, wherein the processor listens the packets transmitted in the local area network in a predetermined time period after the target client device is booted or rebooted or periodically listens the packets.

10. The apparatus for network address analysis according to claim 6, wherein the unique identification information comprises one or a combination of a MAC address, a network card name, a device name and a device model.

* * * * *